United States Patent
Sharma et al.

(10) Patent No.: US 9,214,176 B1
(45) Date of Patent: Dec. 15, 2015

(54) PZT LIMITER FOR A MICRO DUAL STAGE ACTUATED SUSPENSION

(71) Applicant: Magnecomp Corporation, Murrieta, CA (US)

(72) Inventors: Ajay Sharma, Bangkok (TH); Preecha Sudachun, Ayuttaya (TH); Ekkapong Simtong, Ayuttaya (TH)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/806,907

(22) Filed: Jul. 23, 2015

Related U.S. Application Data

(60) Provisional application No. 62/035,290, filed on Aug. 8, 2014.

(51) Int. Cl.
*G11B 5/48* (2006.01)
*G11B 5/596* (2006.01)
*G11B 19/04* (2006.01)
*G11B 33/08* (2006.01)

(52) U.S. Cl.
CPC .......... *G11B 5/59694* (2013.01); *G11B 5/4873* (2013.01); *G11B 19/042* (2013.01); *G11B 33/08* (2013.01)

(58) Field of Classification Search
CPC ...... G11B 5/48; G11B 5/4833; G11B 5/4873; G11B 5/484; G11B 5/4846
USPC ................................. 360/245–245.9
See application file for complete search history.

(56) References Cited

U.S. PATENT DOCUMENTS

| | | | | |
|---|---|---|---|---|
| 6,320,729 B1 * | 11/2001 | Coon | ................... | G11B 5/4826 360/245.7 |
| 6,873,497 B2 * | 3/2005 | Yao | ....................... | G11B 5/5552 360/245.7 |
| 2004/0070883 A1 * | 4/2004 | Mahoney | ............. | G11B 5/4833 360/245.7 |
| 2006/0056096 A1 * | 3/2006 | Nakajima | ............. | G11B 5/6005 360/75 |
| 2014/0078621 A1 * | 3/2014 | Miller | .................. | G11B 5/4826 360/244.2 |

* cited by examiner

*Primary Examiner* — Allen T Cao
(74) *Attorney, Agent, or Firm* — Intellectual Property Law Offices of Joel Voelzke, APC

(57) ABSTRACT

A PZT limiter in a microactuator type dual stage actuated (DSA) suspension limits travel of the PZT, particularly of the cantilevered end of the PZT and particularly during non-operational shock. The PZT limiter thus limits the stresses including bending placed on the PZT during the shock event and thus helps to prevent cracking of the PZT. Additionally, by limiting displacement of the PZT, the limiter improves the mechanic and electrical performance of the suspension during operation.

20 Claims, 4 Drawing Sheets

PZT LIMITER FOR A MICRO DUAL STAGE ACTUATED SUSPENSION

CROSS-REFERENCE TO RELATED APPLICATIONS

This application claims benefit of U.S. Provisional Patent Application No. 62/035,290 filed Aug. 8, 2014.

BACKGROUND OF THE INVENTION

1. Field of the Invention

This invention relates to the field of suspensions for disk drives. More particularly, this invention relates to the field of a PZT travel limiter for micro dual stage actuated (DSA) suspensions.

2. Description of Related Art

Disk drive assemblies typically include a voice coil motor (VCM) which mover the suspension in order to position the read/write head on the spinning magnetic disk medium. Dual stage actuated (DSA) suspensions are suspensions that, in addition to the VCM, include at least one actuator mounted somewhere on the suspension itself in order to effect fine positional movements of the read/write head, also called the head slider. Milli-actuators are broadly classified as actuators that move the entire front end of the suspension: spring, load beam, flexure and slider. Micro-actuators are broadly classified as actuators that move only the slider, moving it relative to the load beam, or moving the read-write element only. The actuators are usually piezoelectric devices, though other types of actuators have been proposed and used.

Without admitting that FIG. 1 is "prior art" within the legal meaning of that term, FIG. 1 is a bottom plan view of the area around flexure 20 in a micro DSA suspension 10 according to a prior design by the assignee of the present application. Such a design is generally shown in U.S. Pat. No. 8,879,210 issued to Hahn, which is assigned to the present applicant. In the suspension 10 of FIG. 1, a flexure 20 is mounted to what will be called the bottom side of load beam 14. Load beam or beam portion 14 extends in a generally horizontal direction and supports flexure 20 and read/write head 38 which is mounted to a gimbaled portion 30 of the flexure. Flexure 20 includes a gimbal 24 which supports read/write head 38 in a gimbaled arrangement so that the read/write head pitches and rolls freely in response to surface irregularities in a surface of the spinning data disk as the data disk magnetic media platter surface travels underneath the read/write head. In addition to gimbal 24 which is typically made of a stainless steel support layer, flexure 20 also includes a flexible circuit 34 which includes an insulating layer such as polyimide and a signal conducting layer such as copper or a copper alloy such as copper/beryllium. A bent finger 26 acts as a tongue limiter to limit travel of read/write head 38 during inertial shock events in order to prevent damage to the suspension. Lifter tab 18 is located at the distal end of suspension 20. The "distal" end of a suspension or load beam is the end that is opposite the proximal end, i.e., the "distal" end is the cantilevered end. The "proximal" end of a suspension or load beam is the end that is supported, i.e., the end that is mounted to an actuator arm.

Two piezoelectric actuators 40, sometimes referred to as microactuators, are located on laterally opposite sides of the suspension. Actuators 40 act in push/pull fashion with one actuator typically contracting while the other actuator expands, or vice versa, in order to effect fine movements of read/write head 38 and thereby to position read/write head 38 precisely over the data track desired. For simplicity, the term "PZT" may be used herein as shorthand to refer to the piezoelectric actuators, it being understood that not all piezoelectric actuators comprise lead zirconate titanate (PZT) material. A first and distal end 42 of PZT 40 is affixed to a relatively movable portion of the flexure, in this case specifically to PZT bonding pads or actuator attachment locations 32 which are part of gimbaled portion 30. A second and proximal end 44 of PZT 40 is affixed to a relatively fixed portion of flexure 20 that substantially does not move relative to load beam 10. A small drop of conductive adhesive 46 such as conductive epoxy carries the PZT driving voltage to the metallized top surface of PZT 40 which defines the PZT's top electrode. When PZT 40 expands or contracts in its longitudinal direction in response to a driving voltage, it pushes or pulls on gimbaled portion 30 to rotate that gimbaled portion and thus move read/write head 38. A servo feedback loop keeps read/write head 38 properly positioned over the desired data track on the data disk.

FIG. 2 is a top perspective view of the suspension 10 of FIG. 1. Tongue limiter 26 extends through aperture 16 in load beam 14, and typically includes T-arms 27 which may or may not be bent as shown.

SUMMARY OF THE INVENTION

The inventors have discovered that, due to the large distance between welds that hold flexure 20 to load beam 14 in the suspension of FIG. 1 and in similar suspensions, PZTs 40 experience a large displacement under shock conditions.

FIG. 3 is a side elevation view of the suspension 10 of FIG. 1 under such shock conditions. Suspension 10 includes base plate 12 and spring region 13 which are not shown in the prior figures. As can be seen in the figure, shock loading produces a very large PZT displacement D. The large PZT displacement and bending stresses created within the PZT thereby can cause PZTs 40, which are relatively fragile, to crack. The large displacement can also make for poor micro DSA suspension mechanical and electrical performance during an operational shock event, due to both off-track and/or off-height problems created by the mechanical displacement, as well as to electrical disruptions created in the data track servo feedback loop caused by voltages that are induced by mechanical strains within the PZTs. The problem arises in DSA suspension designs in which the PZTs are not rigidly affixed at both their ends to the load beam or to any portion of the load beam proximal to the load beam such as the base plate.

In order to mitigate and/or avoid the various problems associated with PZT displacement in prior suspension designs, according to the invention a PZT displacement limiter is added to the suspension in order to limit the Z-direction displacement or travel of each PZT. In the illustrative embodiment, the PZT limiters are formed integrally with, and bent from, the same stainless steel layer or other metal support layer from which the flexure is formed, in much the same way that the head slider limiter or tongue limiter is formed.

The PZT limiters can engage corresponding portions of the load beam to limit the vertical displacement of the PZTs, such as by projecting through an aperture(s) in the load beam and engaging the other side thereof, in much the same way that a conventional tongue limiter engages the load beam through an aperture therein to limit the Z-direction displacement of the tongue and hence the read/write head that is attached to the tongue. The maximum travel distance is thus predefined by a gap distance between interacting components.

In an exemplary embodiment, the vertical travel of the PZT is constrained by a limiter that takes the form of a finger that extends from the PZT mounting region on the gimbaled portion of the flexure. The finger is bent so that it extends from the PZT mounting region which is on the bottom side of the load beam, through an aperture in the load beam and to the top side of the load beam, and abuts against the load beam top surface when the predefined maximum travel distance has been reached. The distal end of the PZT, which his mounted to the gimbaled region, can travel up and down relatively freely within a predefined limited travel distance, until the bent finger abuts up against the load beam's top surface which acts as a stop to prevent further vertical movement of the finger. The two PZTs each have their own associated limiter, in addition to the standard tongue limiter which limits travel of the read/write head. By limiting the vertical travel of the frame PZTs in response to shock, the PZT limiters help to prevent cracking and other damage to the PZTs.

DETAILED DESCRIPTION OF THE PREFERRED EMBODIMENTS

Figure 1:
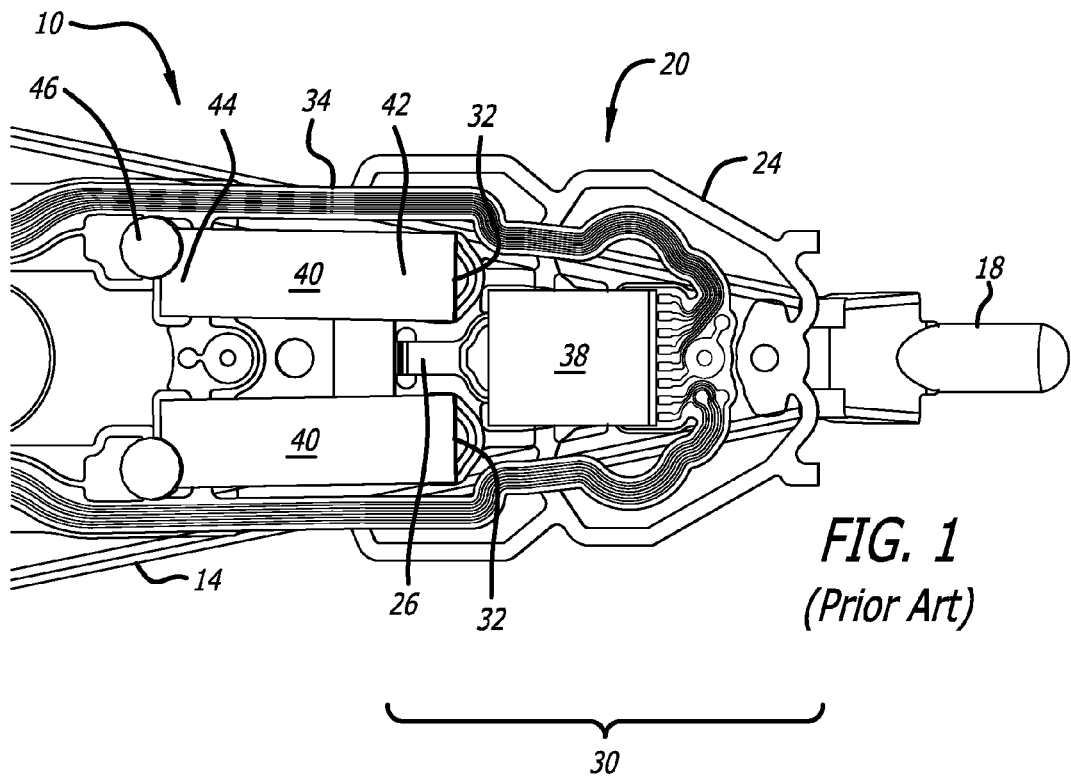
FIG. 1 is a bottom plan view of the area around the flexure in a micro DSA suspension according to a prior design.
Figure 2:
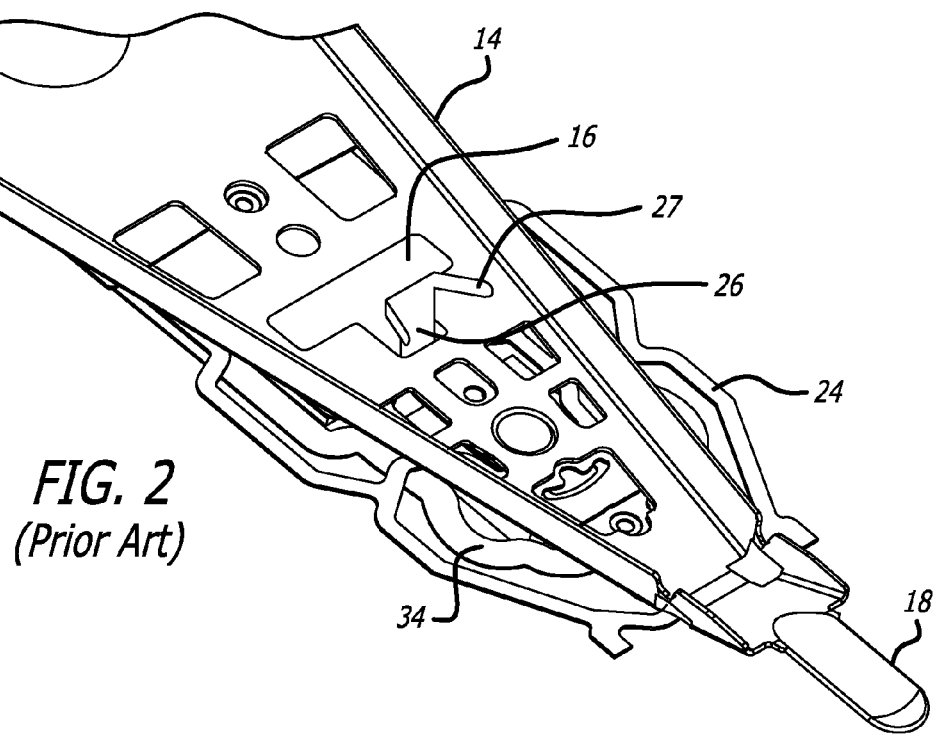
FIG. 2 is a top perspective view of the suspension of FIG. 1.
Figure 3:
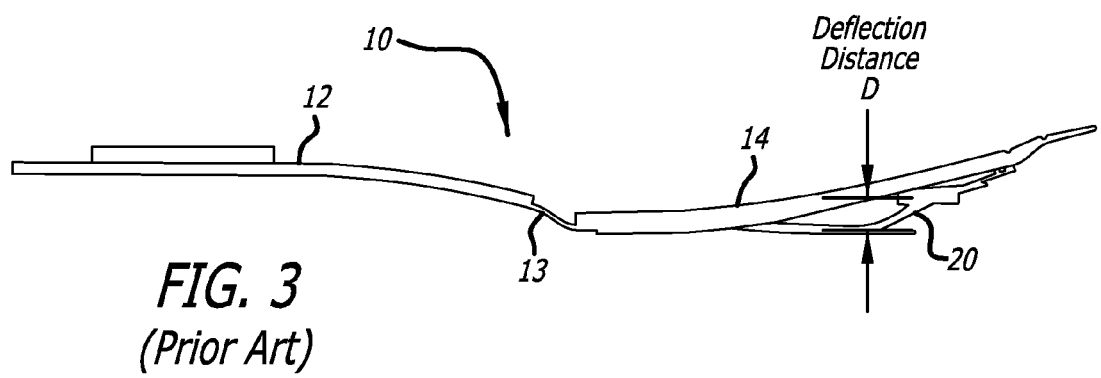
FIG. 3 is a side elevation view of the suspension of FIG. 1 under shock condition.
Figure 4:
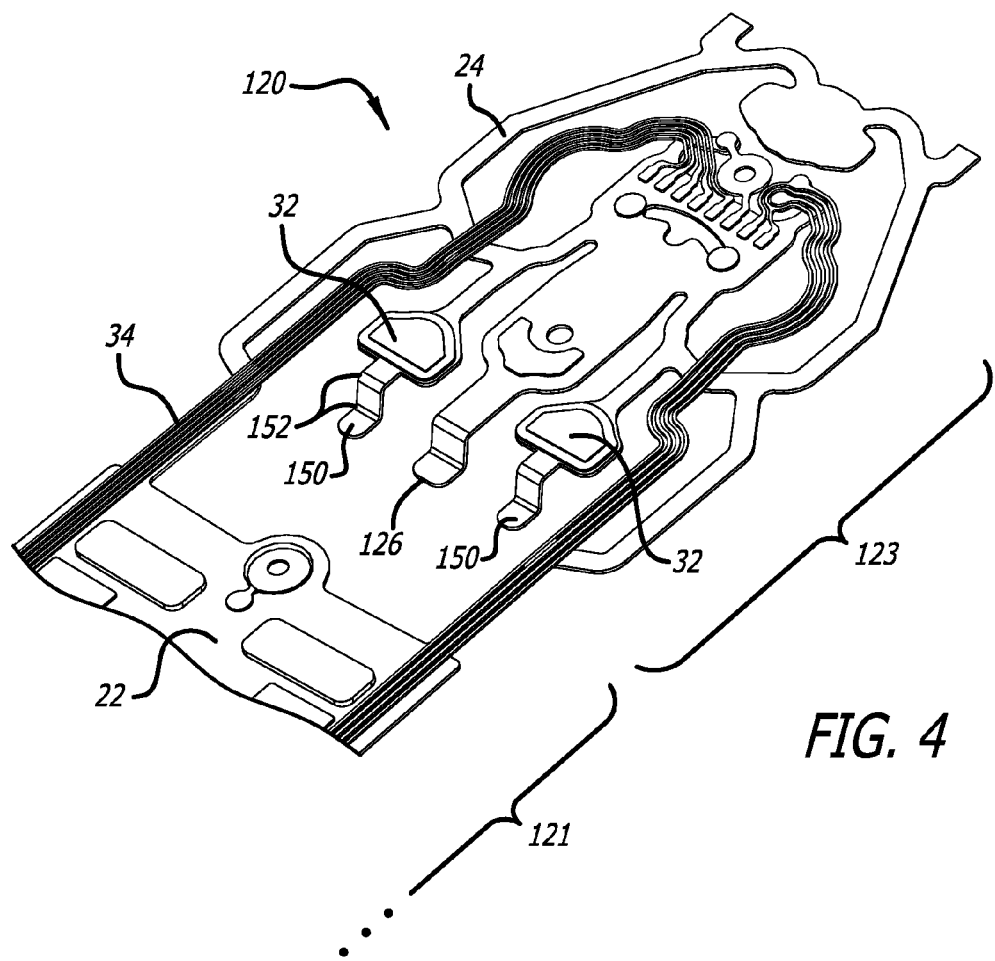
FIG. 4 is a bottom perspective view of a flexure according to an illustrative embodiment of the invention.

FIG. 4 is a bottom perspective view of a flexure 120 according to an illustrative embodiment of the invention. Flexure 120 includes a stainless steel support layer 22 from which gimbal 24 is integrally formed, a flexible circuit 34, and a tongue limiter 126 formed from the stainless steel layer. Flexure 120 also includes two PZT limiters 150 according to the invention. Each PZT limiter 150 comprises a finger that extends from PZT bonding pad or actuator attachment location 32 in a proximal direction, and having two bends 152. Because PZT bonding pads 32 are part of the gimbaled region 130 which defines a region 123 which is movable relative to load beam 114, the end of the PZT that is mounted to PZT bonding pad 32 will be relatively unconstrained in the vertical direction. In other words, in the absence of PZT limiters 150, the PZTs would be effectively cantilevered with their cantilevered ends travelling relatively freely in the vertical direction in response to vertical shock. In contrast, the ends of the PZTs that are bonded to flexure portion 121 that does not move relative to the load, are not free to travel vertically.

The PZT limiters 150 limit the Z-displacement of the two PZTs 40 on a gimbal-mounted DSA suspension 10, and in particular limit the Z-displacement of distal ends 42. Preferably tongue limiter 126 and the two PZT limiters 150 are all formed at the same time, including being bent at the same time, thus resulting in no additional manufacturing steps and no significant additional cost.

Figure 5:
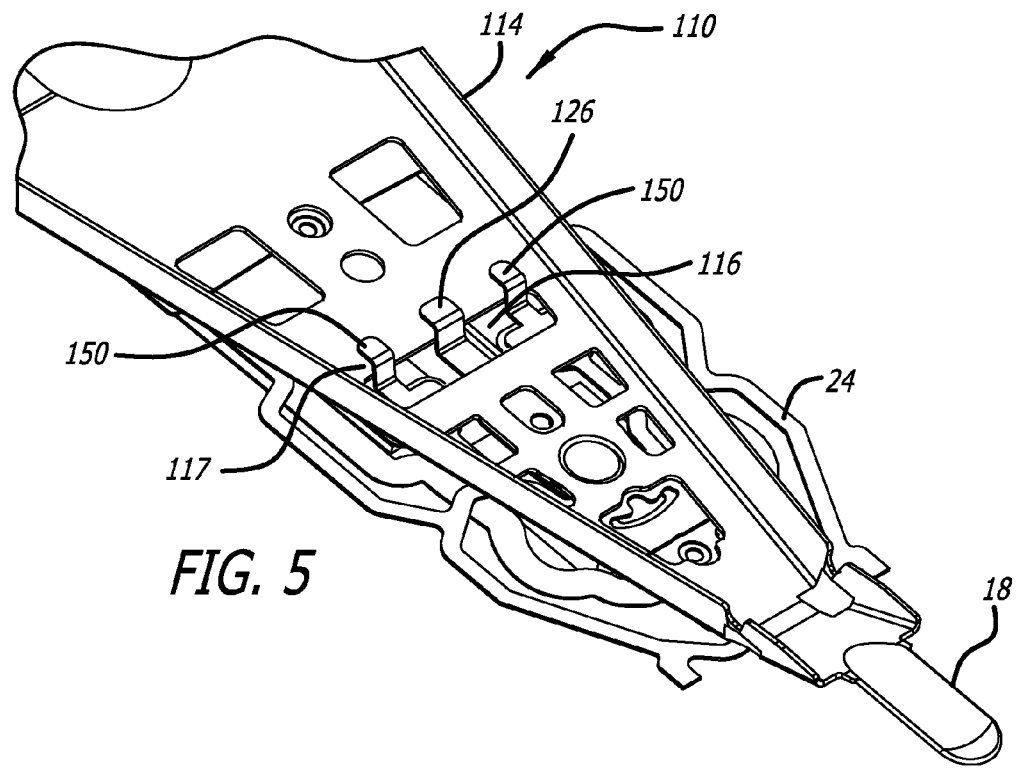
FIG. 5 is a top perspective view of a suspension according to an illustrative embodiment of the invention including the flexure of FIG. 4.

FIG. 5 is a top perspective view of a suspension 110 according to an illustrative embodiment of the invention including both a load beam 114 and the flexure 120 of FIG. 4. Limiter fingers 150 and 126 extend through aperture 116 in load beam 114, from the bottom side of load beam 114 to its top side, with limiter fingers 150 extending to positions over their respectively associated PZTs 40. The limiters 150 are located adjacent the distal ends of their respective PZTs 40, and are located closer to those distal ends of the PZTs than to the proximal ends of the PZTs. When the suspension experiences a shock having a large enough vertical component, the ends of bent fingers 150 come into contact with, and abut up against, the top surface of load beam 114. The top surface of load beam 114 therefore acts as a stop 117 to limit any further travel of fingers 150 and thus to prevent further deflection of the cantilevered distal ends 42 of PZTs 40. More generally, a portion of the gimbaled region of the flexure engages a corresponding portion of the load beam to limit vertical displacement of the PZTs 40, or at least to limit movement of an otherwise relatively unconstrained end of PZT's 40.

Preferably the limiters 126 and 150 are all separate, allowing the greatest freedom of movement to gimbaled region 130, and without any material connecting the limiters in order to minimize the mass and weight of the limiters.

Figure 6:
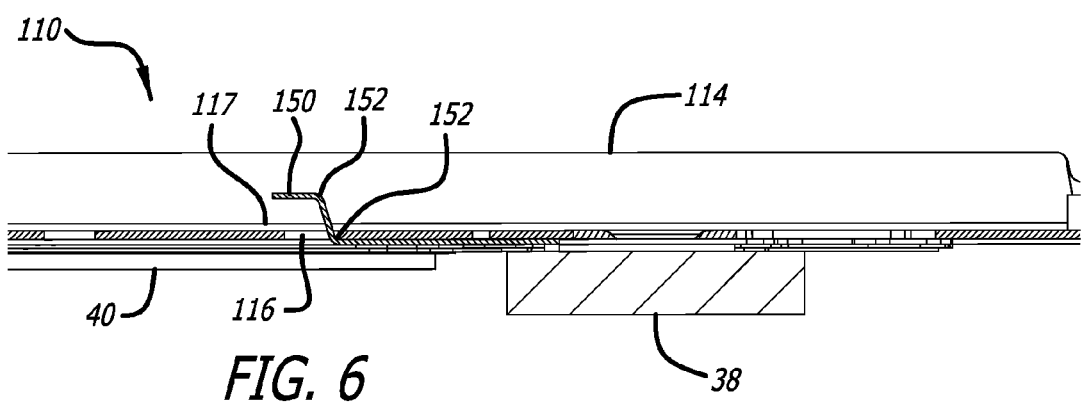
FIG. 6 is a side elevation view of the suspension of FIG. 5.

FIG. 6 is a side elevation view of the suspension of FIG. 5, showing PZT limiters 150 extending from the bottom side of load beam 114 up through aperture 116 and to the top side of the load beam, the fingers 150 being limited in their vertical travel distance by stop(s) 117. The separation between finger 150 and stop surface 117 at a quiescent condition defines a gap, the gap defining the maximum vertical movement of the PZTs.

Figure 7:
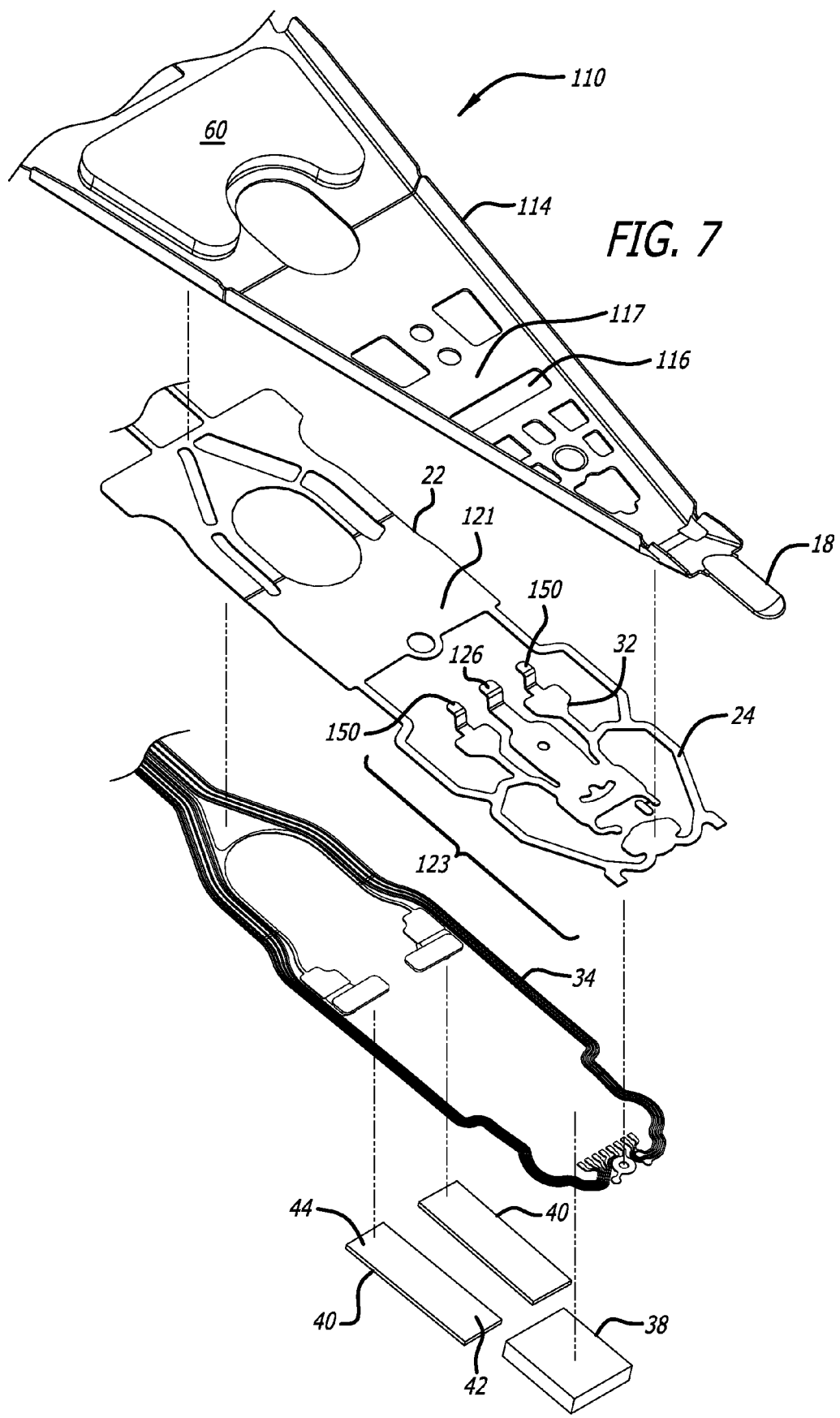
FIG. 7 is an exploded view of the suspension of FIG. 5.

FIG. 7 is an exploded view of the suspension of FIG. 5. Also visible in this figure is vibration damper 60 which is conventional.

Other structures and manufacturing methods are possible, as long as a stop is provided that limits the travel distance of the PZTs, and/or otherwise limits the stresses that will be placed on the PZTs. For example, instead of the limiter being a bent finger or tab that is formed integrally with the flexure and interacts with a corresponding aperture and/or other stop surface formed from the load beam, the limiter could be a bent finger or tab that is formed integrally with the load beam and interacts with a corresponding aperture and/or other stop surfaced formed from the aperture, similar to the arrangement show in U.S. Pat. No. 7,751,149 issued to Mei. The limiter could be a feature such as a finger that extends from the load beam, and is bent so that it extends underneath the PZT and directly limits the movement of the PZT by abutting against it. The limiter could be flexible to absorb shock, or could comprise multiple-step limiters with one or more of the limiters absorbing shock, such as disclosed in U.S. Pat. No. 7,719,797 to Mei. The limiter could include an offset portion to facilitate bending of the limiter after joining the flexure to the load beam, as disclosed in U.S. Pat. No. 7,551,401 to Ciurea et al. All of those patents are assigned to the present applicant, and all are incorporated by reference as if set forth fully herein for their teachings of limiter structures. Furthermore, the two PZT limiters and the tongue limiter could extend through the same aperture in the load beam, or they could extend through separate apertures. All of the limiter structures and travel-limiting techniques disclosed herein, and all of the limiter structures and travel-limiting techniques disclosed in the references which are incorporated by reference herein, constitute various means for limiting travel of at least the cantilevered ends of the PZTs.

It will be understood that the terms "generally," "approximately," "about," "substantially," and/or "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

We claim:

1. A dual stage actuator (DSA) type suspension for a disk drive, the suspension comprising:
   a load beam;
   a flexure affixed to the load beam, the flexure having a gimbaled portion including a read/write head, the gimbaled portion being gimbaled on the load beam so that the head slider pitches and rolls freely in response to surface irregularities in a surface of a data disk as the data disk travels underneath the head slider;
   a piezoelectric actuator having a first end attached to the gimbaled portion at an actuator attachment location thereof;
   a limiter comprising a finger extending from the actuator attachment location, the finger engaging the load beam in such a way that the finger is free to move vertically within a limited range beyond which the finger abuts against a fixed portion of the suspension relative to the load beam to prevent further vertical movement of the finger;
   whereby the limiter limits vertical movement of the first end of the actuator during a shock event thereby limiting a bending stress induced in the actuator during said shock event.

2. The DSA suspension of claim 1 wherein the actuator has a second end opposite the first end, the second end being attached to a fixed portion of the suspension such that the fixed portion substantially does not move relative to the load beam.

3. The DSA suspension of claim 1 wherein the actuator has a second end opposite the first end, the second end being affixed to a non-gimbaled portion of the flexure.

4. The DSA suspension of claim 1 wherein the piezoelectric actuator defines a first piezoelectric actuator on a first lateral side of the read/write head, the limiter defines a first limiter, and the finger defines a first finger, the suspension further comprising:
   a second piezoelectric actuator on a second lateral side of the read/write head opposite the first later side;
   a second limiter comprising a second finger separate from the first finger;
   and wherein:
   the first and second fingers extend through an aperture in the load beam to a side of the load beam opposite a side on which the flexure is mounted to the load beam.

5. The DSA suspension of claim 2 wherein said fixed portion of the suspension relative to the load beam is the load beam.

6. The DSA suspension of claim 1 wherein the finger extends from the attachment location toward a proximal end of the suspension and through the an aperture in the load beam.

7. A dual stage actuator (DSA) type suspension for a disk drive, the suspension comprising:
   a load beam;
   a flexure affixed to the load beam, the flexure carrying a read/write head on a gimbaled portion thereof;
   first and second piezoelectric actuators affixed to the flexure for moving the read/write head, the piezoelectric actuators being located on respectively opposite lateral sides of the read/write head;
   a first limiter for limiting vertical movement of the first piezoelectric actuator relative to the load beam;
   a second limiter for limiting vertical movement of the second piezoelectric actuator relative to the load beam; and
   a third limiter for limiting vertical movement of the read/write head relative to the load beam.

8. The DSA suspension of claim 7 wherein the first, second, and third limiters are separate from one another.

9. The DSA suspension of claim 7 wherein the first, second, and third limiters comprise separate fingers extending from the flexure and separately interacting with the load beam during a shock event.

10. The DSA suspension of claim 9 wherein the flexure is mounted on a bottom side of the load beam, and the first and second fingers extend through apertures in the load beam to a top side of the load beam and to positions over the first and second actuators, respectively.

11. The DSA suspension of claim 9 wherein each of the first and second piezoelectric actuators has:
    a first and distal end;
    a second and proximal end opposite the first end, the proximal end being generally unmovable relative to the load beam, and the distal end having more freedom of movement relative to the load beam than the proximal end;
    and wherein the first and second limiters are disposed closer to the distal ends of the first and second actuators, respectively, than to the proximal ends thereof.

12. The DSA suspension of claim 9 wherein the first and second limiters comprise portions of the flexure that pass from a first side of the load beam to a second and opposite side of the load beam.

13. A dual stage actuator (DSA) type suspension for a disk drive, the suspension comprising:
    a beam extending in a generally horizontal direction;
    a gimbaled portion on the beam, the gimbaled portion including a read/write head for writing data to, and reading data from, a data disk;
    a piezoelectric actuator for effecting fine movements of the read/write head, the piezoelectric actuator being not rigidly affixed at both of two opposite ends thereof to the beam or to any portion of the suspension proximal of the beam, at least a first end of the piezoelectric actuator being connected to the gimbaled portion such that said first end is not rigidly restrained and is free to move vertically within a limited range relative to the beam; and
    means for limiting vertical movement of at least the first end of the piezoelectric actuator relative to the beam.

14. The DSA suspension of claim 13 wherein said means for limiting vertical movement comprises interacting respective first and second parts of the gimbaled portion and the beam, the interacting parts defining a stop that constrains movement of said first end of the piezoelectric actuator to no more than a predefined amount.

15. The DSA suspension of claim 13 wherein said means for limiting vertical movement comprises a means for preventing said vertical movement beyond a predefined limit.

16. The DSA suspension of claim 15 wherein said predefined limit is defined by a gap between interacting components.

17. The DSA suspension of claim 14 wherein said interacting parts constitute a finger and an associated stop.

18. The DSA suspension of claim 14 wherein said finger extends through an aperture in the load beam and has a bend therein such that during a shock event the distal portion of the finger abuts against the load beam to limit movement of the actuator.

19. The DSA suspension of claim 13 wherein said means for limiting vertical movement comprises a bent finger extending from the load beam, the finger constituting a stop such that during a shock event the piezoelectric actuator abuts against the bent finger to limit vertical movement of the actuator.

20. The DSA suspension of claim 19 wherein the bent finger extends from a mounting pad to which the first end of the actuator is affixed.

\* \* \* \* \*